US012565176B2

(12) United States Patent
Baudouin et al.

(10) Patent No.: US 12,565,176 B2
(45) Date of Patent: Mar. 3, 2026

(54) DEVICE FOR CLEANING A DETECTION SURFACE OF A DETECTION DEVICE

(71) Applicant: VALEO SYSTEMES D'ESSUYAGE, La Verriere (FR)

(72) Inventors: Maxime Baudouin, La Verriere (FR); Philippe Picot, La Verriere (FR); William Terrasse, La Verriere (FR); Jordan Vieille, La Verriere (FR)

(73) Assignee: Valeo Systemes d'Essuyage, La Verrière (FR)

( * ) Notice: Subject to any disclaimer, the term of this patent is extended or adjusted under 35 U.S.C. 154(b) by 81 days.

(21) Appl. No.: 18/551,434

(22) PCT Filed: Mar. 23, 2022

(86) PCT No.: PCT/EP2022/057680
§ 371 (c)(1),
(2) Date: Sep. 20, 2023

(87) PCT Pub. No.: WO2022/200459
PCT Pub. Date: Sep. 29, 2022

(65) Prior Publication Data
US 2024/0198976 A1 Jun. 20, 2024

(30) Foreign Application Priority Data
Mar. 23, 2021 (FR) ...................................... 2102870

(51) Int. Cl.
*B60S 1/56* (2006.01)
*B60S 1/52* (2006.01)
*B60S 1/54* (2006.01)

(52) U.S. Cl.
CPC . *B60S 1/56* (2013.01); *B60S 1/52* (2013.01); *B60S 1/54* (2013.01)

(58) Field of Classification Search
None
See application file for complete search history.

(56) References Cited

U.S. PATENT DOCUMENTS 5,657,929 A * 8/1997 DeWitt ..................... B60S 1/52
239/284.2
10,882,495 B2 1/2021 Galera et al.
(Continued)

FOREIGN PATENT DOCUMENTS

EP 2873571 A1 5/2015
EP 3715193 A1 9/2020
(Continued)

OTHER PUBLICATIONS

Japan Patent Office, 1st Office Action (with English translation) dated Aug. 27, 2024 corresponding of Japanese Patent Application No. 2023-558539.
(Continued)

*Primary Examiner* — Omair Chaudhri
(74) *Attorney, Agent, or Firm* — Valeo Systemes d'Essuyage

(57) ABSTRACT
The present invention mainly relates to a device for cleaning a glazed surface of a detection device for a vehicle, the cleaning device includes at least two parts fitted one against the other which at least in part delimit a network for distributing a cleaning liquid and a circuit for channeling an air flow, the network for distributing the cleaning liquid being distinct from the circuit for channeling the air flow.

8 Claims, 5 Drawing Sheets

(56)  References Cited

U.S. PATENT DOCUMENTS

| | | | | |
|---|---|---|---|---|
| 11,535,201 | B2 | 12/2022 | Kondo et al. | |
| 2002/0005440 | A1* | 1/2002 | Holt ..................... | B05B 15/652 |
| | | | | 239/284.2 |
| 2013/0048035 | A1* | 2/2013 | Doi .......................... | B60S 1/48 |
| | | | | 134/123 |
| 2018/0126921 | A1* | 5/2018 | Koseki ..................... | B08B 5/02 |
| 2020/0307524 | A1* | 10/2020 | Morita ................... | B05B 1/323 |
| 2021/0070257 | A1* | 3/2021 | Kondo ..................... | B60Q 1/56 |
| 2022/0126790 | A1* | 4/2022 | Matsunaga .............. | B60S 1/54 |
| 2024/0425016 | A1* | 12/2024 | Edwards ................ | B60S 1/487 |

FOREIGN PATENT DOCUMENTS

| | | | | | |
|---|---|---|---|---|---|
| FR | 3056515 | A1 | 3/2018 | | |
| JP | 2017-193323 | A | 10/2017 | | |
| WO | 9704875 | A1 | 2/1997 | | |
| WO | 2014010579 | A1 | 1/2014 | | |
| WO | WO-2018059770 | A1 * | 4/2018 | ............. | B60S 1/528 |
| WO | 2019044402 | A1 | 3/2019 | | |

OTHER PUBLICATIONS

European Patent Office, International Search Report (with English translation) and Written Opinion of corresponding International Application No. PCT/EP2022/057680, dated Jul. 12, 2022.

* cited by examiner

DEVICE FOR CLEANING A DETECTION SURFACE OF A DETECTION DEVICE

TECHNICAL FIELD

The present invention falls within the field of systems for cleaning detection devices of a vehicle, and relates more particularly to a cleaning device that sprays cleaning liquid onto a detection surface of a detection device.

BACKGROUND OF THE INVENTION

In recent years, numerous items of equipment have been added to the latest vehicle models. Of these items of equipment, some work through detection devices, such as, for example, autonomous-driving systems. The latter comprise a plurality of detection devices such as cameras, radars, LIDARs (light detection and ranging) or else infrared-wave sensors, for example. Such detection devices generally comprise a detection surface via which the waves emitted by said detection device are emitted into the external environment surrounding the vehicle on which the autonomous driving system is installed. This detection surface is generally optically neutral and must be suitable for not disturbing the signals emitted or received by the detection device.

In order to maintain good operation of these detection devices over the course of time, systems for cleaning detection devices have also been developed over recent years. These systems generally comprise at least one cleaning device installed on the detection device and able to spray cleaning liquid against the detection surface of said device. Moreover, the cleaning system may also comprise a circuit able to guide a flow of air toward the detection surface.

The spraying of liquid and the blowing performed by the air circuit are positioned close to the detection surface of one of the detection devices so as to optimize the cleaning of said detection surface. Nevertheless, the liquid spraying function and the blowing function are not integrated optimally. These systems nowadays are particularly complex and therefore difficult to implement.

BRIEF SUMMARY OF THE INVENTION

The present invention thus seeks to improve such cleaning systems by proposing a cleaning device able to spray cleaning liquid and to guide a flow of air toward the detection surface of the detection device within a module which is optimized for best performing these two functions.

The main subject of the present invention is a cleaning device for cleaning a glazed surface of a detection device for a vehicle, the cleaning device comprising at least two parts fitted against one another and which at least partly delimit a cleaning liquid distribution network and an air flow ducting circuit, the cleaning liquid distribution network being distinct from the air flow ducting circuit.

In other words, the cleaning device comprises, on the one hand, the cleaning liquid distribution network and, on the other hand, the air flow ducting circuit, said cleaning device thus being capable both of spraying cleaning liquid toward the detection surface of the detection device and of guiding the air flow toward this detection surface, all from within the one same particularly compact module.

It will additionally be appreciated that part of the distribution network and of the ducting circuit is formed by the collaboration between the two constituent parts of the cleaning device. In other words, the collaboration between the two constituent parts of the cleaning device makes it possible, on the one hand, to convey the cleaning liquid toward the detection surface and, on the other hand, to guide the air flow toward this detection surface.

What is meant by "distinct" is that the distribution network and the ducting circuit do not communicate with one another, the cleaning liquid flowing in the distribution network thus not being in contact with the air flow circulating through the ducting circuit.

Moreover, the cleaning device is made up of at least two parts mounted one on the other to form said cleaning device. The two parts may be of the same composition, which is to say of the same material such as a synthetic material such as PVC (polyvinyl chloride) for example, and are secured to one another by ultrasonic welding, for example.

What is meant by a glazed surface is any type of optical surface allowing the passage of signals of the detection device. The glazed surface may thus be made of glass, plastics material or any type of materials known to those skilled in the art that allow the passage of signals of the detection device.

It will be appreciated that the collaboration between the at least two parts makes it possible to form at least part of the distribution network and of the ducting circuit.

According to one optional feature, the cleaning liquid distribution network comprises a cleaning liquid spray outlet.

According to one optional feature, the ducting circuit comprises an air flow outlet.

It will therefore be appreciated that the cleaning liquid spray outlet and the air flow outlet are distinct.

It will be appreciated that the cleaning liquid distribution network and the air flow ducting circuit are distinct as far as their respective outlets: the air flow outlet and the cleaning liquid spray outlet.

According to another optional feature of the invention, at least one dimension of the spray outlet is an increasing dimension, this dimension being measured perpendicular to a direction of flow of the cleaning liquid.

It will be appreciated that the at least one dimension increases from an upstream end portion of the spray outlet in a direction of flow of the cleaning liquid, namely an end portion adjacent to the chamber, as far as a downstream end portion of the spray outlet in a direction of flow of the cleaning liquid, namely an opposite end portion to the end that is adjacent to the chamber.

It will be appreciated that the spray outlet is positioned in the continuation of the chamber.

In other words, the cleaning fluid spray outlet widens between an end portion that is upstream, in the direction of flow of the jet of fluid, and an end portion that is downstream in the direction of flow of the jet of fluid.

According to one optional feature of the invention, the distribution network further comprises at least a pipe and a chamber, the cleaning liquid spray outlet being hydraulically connected to the pipe by the chamber.

In this configuration, the cleaning liquid can thus flow toward the spray outlet from the pipe by flowing through the chamber.

According to another optional feature of the invention, the chamber is delimited by the two parts.

According to another optional feature of the invention, the spray outlet is delimited by the two parts.

According to one optional feature of the invention, the pipe is delimited by just one of the two parts.

According to one aspect of the invention, the pipe is formed entirely by one of the two parts and is configured to be hydraulically connected to a cleaning liquid distribution system installed on the vehicle and/or on an autonomous driving system of the vehicle, this distribution system conveying the cleaning liquid as far as the cleaning device. In other words, the one same single part delimits the pipe.

According to one feature of the invention, the chamber and the spray outlet are elements of the distribution network which are formed by the collaboration between the two constituent parts of the cleaning device. In other words, the chamber and the spray outlet are delimited solely by the two constituent parts of the cleaning device.

Moreover, the cleaning liquid is sprayed onto the detection surface at the spray outlet of the distribution network.

According to another optional feature of the invention, one and/or the other of the two parts contributes to delimiting at least one conduit extending into the chamber and opening at the spray outlet.

According to another optional feature, one or the other of the two parts bears a spray wall extending in a plane secant to a main direction of elongation of the conduit.

What is meant by "conduit" is that a cross section for the flow of the cleaning liquid is smaller at this conduit than at the rest of the chamber. The cleaning liquid therefore has a higher flow velocity at the conduit by comparison with its flow velocity in the chamber, so that the flow rate in the conduit and in the chamber are the same.

Thanks to the increase in its flow velocity and because the conduit is inclined relative to the spray wall, the cleaning liquid is sprayed against the spray wall and forms a flat jet, which is to say a jet in which the cleaning liquid extends along a plane, toward the detection surface.

According to another optional feature of the invention, at least one dimension of one end of the conduit at the spray outlet is an increasing dimension, increasing toward the spray outlet, this dimension being measured perpendicular to a direction of flow of the cleaning liquid within the conduit.

According to another optional feature of the invention, the ducting circuit further comprises at least a duct and a cavity, the air flow outlet being aeraulically connected to the duct by the cavity.

According to one optional feature of the invention, the cavity is delimited by the two parts.

According to one optional feature of the invention, the air flow outlet is delimited by the two parts.

According to one optional feature of the invention, the duct is delimited by just one of the two parts.

According to one feature of the invention, the air flow can thus circulate toward the air flow outlet from the duct by circulating through the cavity. In this configuration, the duct is formed entirely by one of the two parts and is configured to be aeraulically connected to an air flow circulation system installed on the vehicle and/or on the autonomous driving system of the vehicle, this circulation system forcing the air flow to circulate as far as the cleaning device. In other words, in this configuration, the one same single part delimits the pipe.

According to one feature of the invention, the cavity and the air flow outlet are elements of the ducting circuit which are formed by the collaboration between the two constituent parts of the cleaning device. In other words, in this configuration, the cavity and the air flow outlet are delimited solely by the two constituent parts of the cleaning device.

Moreover, the air flow is guided toward the detection surface at the air flow outlet of the ducting circuit.

According to another optional feature of the invention, the cleaning device comprises an attachment element for attachment to a detection device.

According to one feature of the invention, the attachment element, the pipe and the duct may be delimited by the one same part of the cleaning device. It will be appreciated that, in this configuration, the one same part of the cleaning device delimits the attachment element and the pipe and the duct.

According to another optional feature of the invention, the pipe extends in an overall direction of extension.

According to another optional feature of the invention, the duct extends in a main direction of extension.

According to another optional feature of the invention, the overall direction of extension is parallel to the main direction of extension.

According to another optional feature of the invention, one of the two parts comprises at least one separation element separating the distribution network from the air flow ducting circuit.

According to one optional feature of the invention, the other part comprises at least one separation member able to collaborate with the separation element so as to separate the distribution network from the air flow ducting circuit in a fluidtight manner.

According to another optional feature of the invention, the separation element is a rib and the separation member is a groove in which the rib is housed.

According to another optional feature of the invention, the distribution network comprises at least a first cleaning liquid spray outlet and at least a second cleaning liquid spray outlet. It will be appreciated that, in this configuration, the cleaning liquid flows from the pipe toward the two spray outlets and thus forms two different flat jets.

According to another optional feature of the invention, the distribution network comprises at least a first cleaning liquid spray outlet, a second cleaning liquid spray outlet and at least a third cleaning liquid spray outlet. It will be appreciated that the cleaning liquid flows from the pipe toward the three spray outlets and thus forms three different flat jets.

According to another optional feature of the invention, the cleaning device comprises a first part, a second part and at least a third part, the first part and the second part contributing to delimiting the cleaning liquid distribution network, the second part and the third part contributing to delimiting the air flow ducting circuit. In other words, the distribution network is delimited solely by the first part and the second part whereas the ducting circuit is delimited solely by the second part and the third part.

In other words, the second part is sandwiched between the first and third part. The second part has a first flank collaborating with the first part to at least partially delimit the distribution network, and a second flank collaborating with the second part to at least partially delimit the ducting circuit.

According to another optional feature of the invention, the distribution network comprises at least a pipe, a chamber, and a cleaning liquid spray outlet hydraulically connected to the pipe by the chamber, the chamber and the spray outlet being delimited by the first and second parts, whereas the pipe is delimited entirely by the first part.

According to another optional feature of the invention, the ducting circuit comprises at least a duct, a cavity, and an air flow outlet aeraulically connected to the duct by the cavity, the cavity and the air flow outlet being delimited by the second part and the third part whereas the duct is delimited entirely by the third part.

The invention also relates to a detection assembly comprising at least one detection surface and a cleaning device for cleaning the detection surface according to any one of the aforementioned features.

According to another optional feature of the invention, the detection surface extends in a main plane, the cleaning device being configured to spray cleaning liquid in the form of a flat jet extending in a plane secant to the main plane.

BRIEF DESCRIPTION OF THE DRAWINGS

Further features, details and advantages of the invention will become more clearly apparent from reading the following description, and also from studying multiple exemplary embodiments given by way of nonlimiting indication, with reference to the appended schematic drawings, in which.

DETAILED DESCRIPTION OF THE INVENTION

The features, variants and different embodiments of the invention may be combined with one another, in various combinations, provided that they are not mutually incompatible or mutually exclusive. In particular, it is possible to imagine variants of the invention that comprise only a selection of features described below, independently of the other features described, if this selection of features is sufficient to confer a technical advantage and/or to differentiate the invention from the prior art.

In the following description, the terms "longitudinal", "transverse" and "vertical" refer to the orientation of a cleaning device according to the invention. A longitudinal direction corresponds to a main direction of extension of a pipe of the cleaning device, this longitudinal direction being parallel to a longitudinal axis L of an L, V, T illustrated in the figures. A transverse direction corresponds to a direction in which an air flow outlet mainly extends, this transverse direction being parallel to a transverse axis T of the frame of reference L, V, T, and this transverse axis T being perpendicular to the longitudinal axis L. Finally, a vertical direction corresponds to a direction parallel to a vertical axis V of the frame of reference L, V, T, this vertical axis V being perpendicular to the longitudinal axis L and the transverse axis T.

In addition, the terms "upstream" and "downstream" as used in the remainder of the description refer to the direction of circulation of a cleaning liquid and/or of an air flow in the cleaning device.

Figure 1:
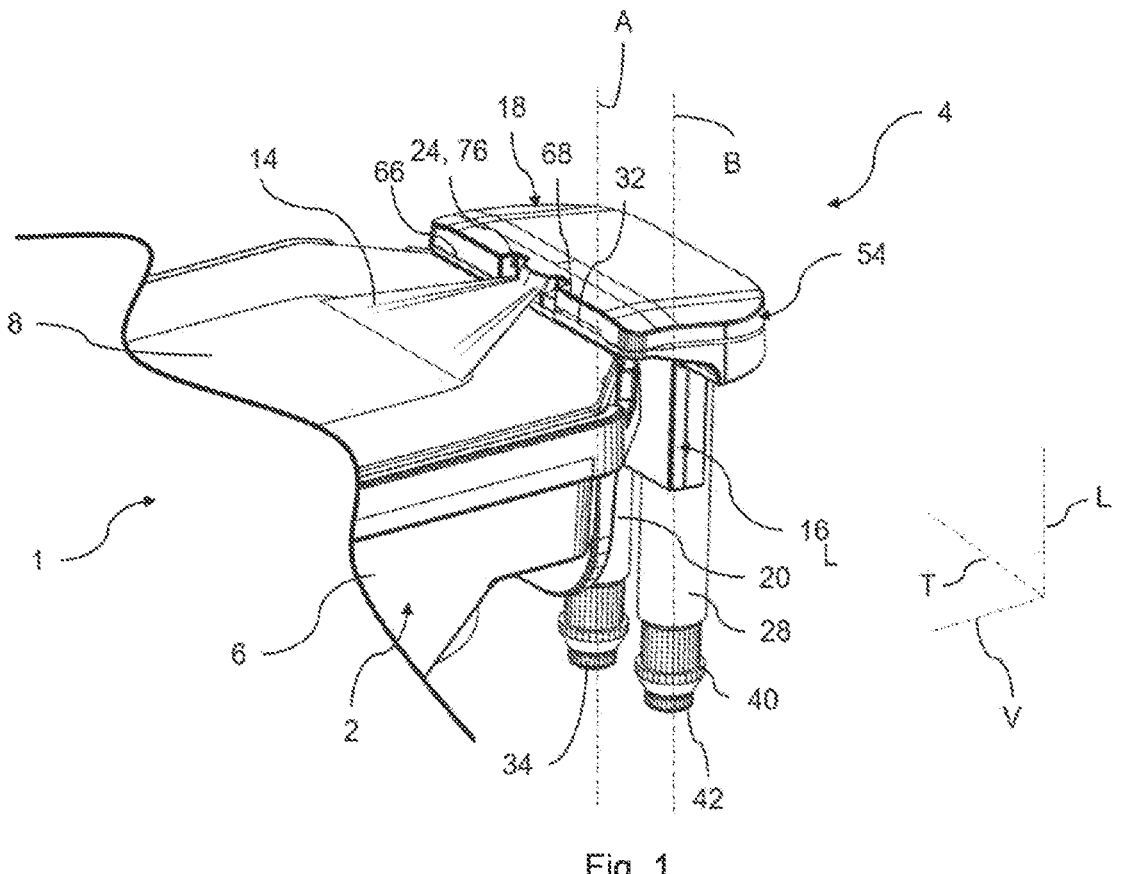
FIG. 1 is a perspective depiction of a detection system equipped with a cleaning device according to the invention.

FIG. 1 depicts a detection assembly 1 configured to be installed for example on a vehicle and/or an autonomous driving system of the vehicle. The detection assembly 1 is made up of at least a detection device 2 and of a cleaning device 4 according to the invention, the latter performing the cleaning of part of the detection device 2.

More particularly, the detection device 2 comprises, on the one hand, a main body 6 comprising for example a sensor, and, on the other hand, a detection surface 8 positioned between the sensor housed in the main body 6 and the external environment surrounding the detection device 2. The sensor of the detection device 2 may for example be a camera, a radar or even a LIDAR, this list not being exhaustive. This type of detection device 2 emits and/or receives electromagnetic waves to and/or from the external environment surrounding the detection device 2 in order to detect one or more objects present in this environment. The detection surface 8 is designed so that the electromagnetic waves emitted and/or received by the sensor can pass through said detection surface 8 without being deflected or modified.

According to the invention, the cleaning device 4 comprises a cleaning liquid distribution network 10 and an air flow ducting circuit 12 distinct from the distribution network 10. The cleaning device 4 is configured to spray the cleaning liquid in the form of a flat jet 14 against the detection surface 8 of the detection device 2, the flat jet 14 being a jet of cleaning liquid extending mainly in a plane. In addition, the cleaning device 4 is also configured to guide an air flow toward the detection surface 8. The spraying of the cleaning liquid by the cleaning device 4 thus allows any element deposited on the detection surface 8 to be cleaned off said surface, and the guiding of the air flow allows the drying of said detection surface 8.

One first embodiment of the cleaning device 4 will now be described, particularly with reference to FIGS. 1 and 2.

As specified hereinabove, the cleaning device 4 comprises, on the one hand, the cleaning liquid distribution network 10 and, on the other hand, the air flow ducting circuit 12, the distribution network 10 and the ducting circuit 12 being distinct from one another. It will be appreciated from that fact that the distribution network 10 and the ducting circuit 12 do not communicate with one another, the cleaning liquid flowing in the distribution network 10 not coming into contact with the air flow circulating through the ducting circuit 12.

Figure 2:
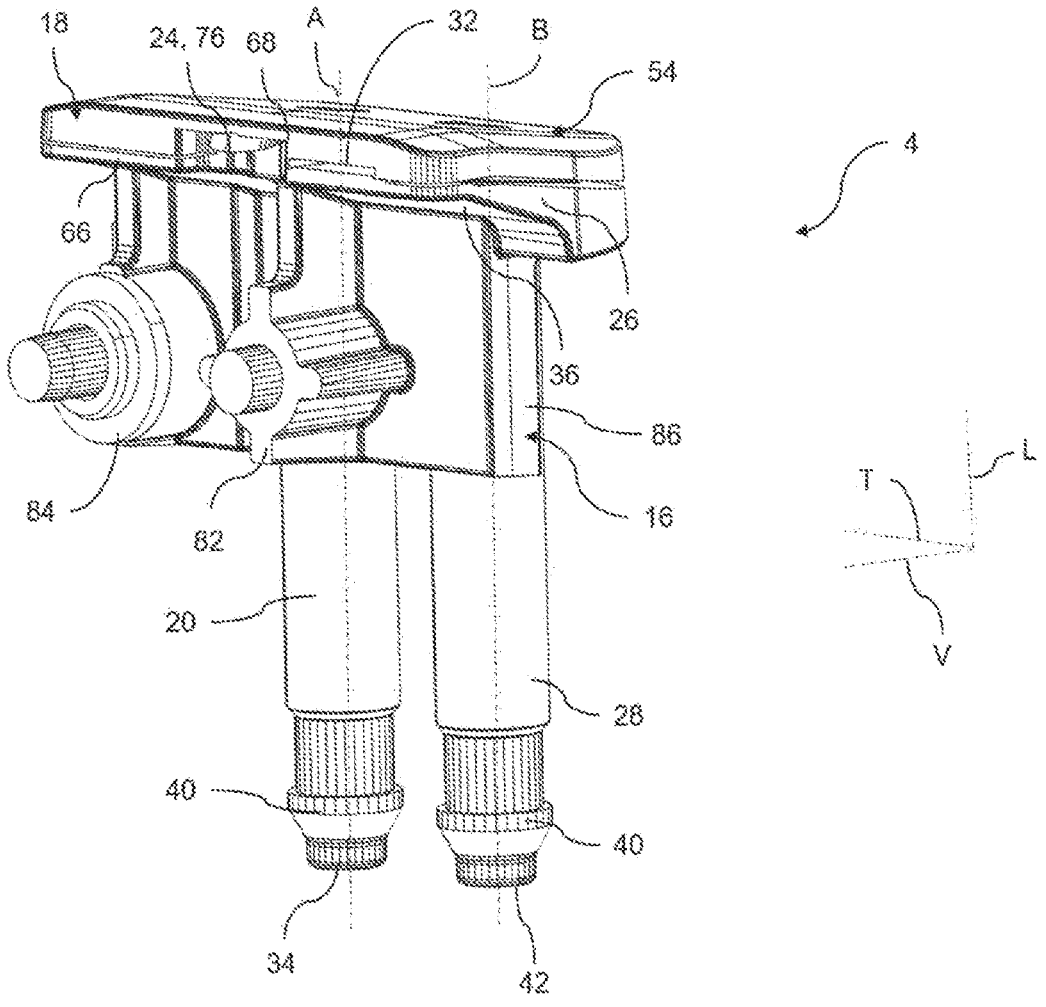
FIG. 2 is a perspective depiction of a cleaning device depicted in FIG. 1.

According to the invention and as more particularly visible in FIG. 2, the cleaning device 4 is made up of at least two parts 16, 18, each of the two parts 16, 18 being fitted to one another and at least partially delimiting the cleaning liquid distribution network 10 and the air flow ducting circuit 12. In other words, the cleaning device 4 comprises a first part 16 and a second part 18 collaborating with one another to delimit at least part of the distribution network 10 and of the ducting circuit 12 in a manner such that one is fluidtight relative to the other. In other words, it is the collaboration between these two parts 16, 18 that makes it possible to form at least part of the distribution network 10 and of the ducting circuit 12.

Moreover, the distribution network 10 comprises at least a pipe 20, a chamber 22 and a cleaning liquid spray outlet 24 hydraulically connected to the pipe 20 by the chamber 22, the chamber 22 and the spray outlet 24 being delimited by the two parts 16, 18, whereas the pipe 20 is delimited by just one of the two parts 16, 18. According to the example illustrated here, the first part 16 comprises the pipe 20 and contributes to forming, with the collaboration of the second part 18, the spray outlet 24 and the chamber 22. The first part 16 comprises a first wall 26 with which the second part 18 collaborates to form the chamber 22 and the spray outlet 24.

In addition, the ducting circuit 12 comprises at least a duct 28, a cavity 30 and an air flow outlet 32 aeraulically connected to the duct 28 by the cavity 30, the cavity 30 and the air flow outlet 32 being delimited by the two parts 16, 18, whereas the duct 28 is delimited by just one of the two parts 16, 18. According to the example illustrated here, the first part 16 comprises the duct 28 and contributes to forming, with the collaboration of the second part 18, the air flow outlet 32 and the cavity 30, the first wall 26 of the first part 16 collaborating with the second part 18 to form the cavity 30 and the air flow outlet.

The pipe 20 and the duct 28 will now be described in further detail before a description is given of the chamber 22, the cavity 30, the spray outlet 24 and the air flow outlet 32.

The pipe 20 of the distribution network 10 here extends in the longitudinal direction L, and advantageously perpendicular to the first wall 26 of the first part 16. According to an alternative, the pipe 20 could extend in a different direction without thereby departing from the scope of the invention. The pipe 20 has the overall shape of a cylinder through which the cleaning liquid can flow. The pipe 20 has a free end 34 and opens, at the opposite end from the free end 34, onto the first wall 26, through which it passes. More specifically, the first wall 26 comprises a first face 36 and a second face 38, the pipe 20 extending from the first face 36 in the direction away from the second face 38. However, the pipe 20 passes through the first wall 26 so that it opens onto the second face 38 of the first wall 26.

The free end 34 comprises, for example, an attachment bead 40 so that the pipe 20 can be attached to a cleaning liquid distribution system of the vehicle and/or of the driver-assist system.

The duct 28 itself extends here in the longitudinal direction L, and advantageously perpendicular to the first wall 26 of the first part 16. It will be appreciated from the foregoing that the pipe 20 extends in an overall direction of extension A, the duct 28 extending in a main direction of extension B, and that the overall direction of extension A of the pipe 20 is parallel to the main direction of extension B of the duct 28. However, the duct 28, just like the pipe 20, could each extend in some other direction without, however, departing from the invention.

In this arrangement and in a similar way to the pipe 20, the duct 28 has the overall form of a cylinder through which the air flow can circulate. The duct 28 likewise has a free edge 42 and opens, at the opposite end from the free edge 42, onto the first wall 26 of the first part 16, through which it passes. More specifically, the duct 28 extends from the first face 36 of the first part 16 in the direction away from the second face 38 and passes through the first wall 26 in such a way that it opens onto the second face 38 of the first wall 26.

The free edge 42 likewise comprises, for example, an attachment bead 40 so that the duct 28 can be attached to an air flow circulation system of the vehicle and/or of the driver-assist system.

Figure 3:
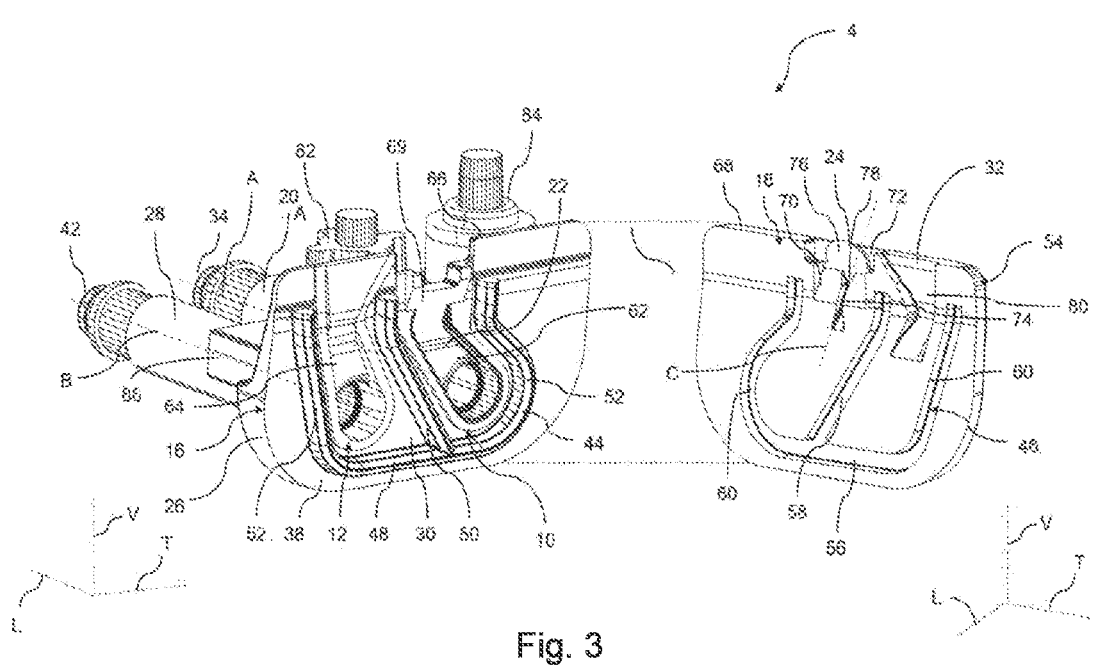
FIG. 3 is an exploded view of the cleaning device depicted in FIG. 1.

As is more particularly visible in FIG. 3, one of the two parts 16, 18 of the cleaning device 4 comprises at least one separation element 44 separating the distribution network 10 from the ducting circuit 12, the other part 16, 18 comprising at least one separation member 46 able to collaborate with the separation element 44 so as to separate the distribution network 10 from the ducting circuit 12 in a fluidtight manner. It will be appreciated that the collaboration between the separation element 44 and the separation member 46, each positioned on one or the other of the parts 16, 18, allows the distribution network 10 and the ducting circuit 12 to be delimited while keeping them fluidtight one relative to the other.

According to one feature of the invention, the separation element 44 is a rib and the separation member 46 is a groove in which the rib is able to be housed. The rib that forms the separation element 44 is moreover dimensioned on the one hand so that it can be housed in the groove and on the other hand so that it is a close fit in the groove which guides it. In other words, the rib and the groove, once mounted one in the other, are in contact with one another and prevent the exchange of fluid between the distribution network 10 and the ducting circuit 12, it being possible for this fluid to come from the air flow just as it may come from the cleaning liquid.

As illustrated in FIG. 3, the first part 16 bears at least one rib forming the separation element 44, and the second part 18 comprises at least one groove forming the separation member 46. More specifically, the first part 16 comprises several ribs extending in a "W" shape, which is to say that the first part 16 comprises a main rib 48 extending in the transverse direction T and three additional ribs extending from the main rib 48 substantially in the same direction, this direction being substantially perpendicular to the transverse direction T and longitudinal direction L. A central additional rib 50 and two end additional ribs 52 flanking the central additional rib 50 may be defined. In this arrangement, the ribs of the first part 16 form two spaces, one of the two spaces being delimited by one of the end additional ribs 52, by the central additional rib 50 and, in part, by the main rib 48, and the other of the two spaces being delimited by the other of the end additional ribs 52, by the central additional rib 50 and, in part, by the main rib 48.

The second part 18 is itself made up of a covering wall 54 comprising several grooves on the one same face and which extend in the form of a "W" symmetrically with respect to the ribs 48, 50, 52 of the first part 16, so as to be able to collaborate with this part. The second part 18 thus comprises a main groove 56 extending in the transverse direction T and three additional grooves extending from the main groove 56 substantially in the same direction, this direction being substantially perpendicular to the transverse direction T and longitudinal direction L. A central additional groove 58 and two end additional grooves 60 flanking the central additional groove 58 may be defined. Once the two parts have been mounted one on the other, the grooves 56, 58, 60 of the second part 18 collaborate with the ribs 48, 50, 52 of the first part 16 so that the main rib 48 becomes housed in the main groove 56, the end additional ribs 52 each become housed in one of the end additional grooves 60, and the central additional rib 50 becomes housed in the central additional groove 58.

As visible in FIG. 3, the second face 38 of the first wall 26 of the first part 16 comprises a first recess 62 at one of the spaces delimited by the ribs 48, 50, 52, and a second recess 64 at the other space formed by the ribs 48, 50, 52. The pipe 20 of the distribution network 10 opens onto the first recess 62, the duct 28 of the ducting circuit 12 opening into the second recess 64.

When the second part 18 is mounted on the first part 16, that face of the covering wall 54 of the second part 18 that comprises the grooves 56, 58, 60 is in contact with the second face 38 of the first wall 26 of the first part 16. In this arrangement, that face of the covering wall 54 that comprises the grooves 56, 58, 60 and the first recess 62 contributes to delimiting the chamber 22 of the distribution network 10, the cavity 30 of the ducting circuit 12 being itself delimited by said face and the second recess 64.

The first wall 26 of the first part 16 comprises a spray edge 66 at which the spray outlet 24 and the air flow outlet 32 are located and toward which the recesses 62, 64 extend from the pipe 20 and/or the duct 28. The covering wall 54 of the second part 18 itself has a spray flank 68 that contributes to delimiting the spray outlet 24 and the air flow outlet 32.

The first part 16 comprises an inclined wall 69 extending at least between the first recess 62 and the spray edge 66. This inclined wall 69 collaborates with an inclined face 70 of the covering wall 54. The latter comprises a niche 72 positioned at the spray outlet 24 where the inclined face 70 is positioned.

In addition, the covering wall 54 comprises a conduit 74 formed at the inclined face 70 and extending in a main direction of elongation between the face comprising the grooves 56, 58, 60 and the niche 72. The conduit 74 is, as illustrated in FIG. 3, open onto the inclined face 70, but could be closed without thereby departing from the scope of the invention.

When the two parts 16, 18 of the cleaning device 4 are mounted one against the other, the inclined wall 69 and the inclined face 70 extend one against the other, such that the inclined wall 69 closes the conduit 74. The first recess 62 of the first part 16 therefore communicates with the outside of the cleaning device 4 only via the conduit 74 of the second part 18.

The niche 72 of the second part 18 comprises a spray wall 76 extending in a plane that is secant to the main direction of elongation of the conduit 74. The spray wall 76 is positioned at an outlet end 78 of the conduit 74 that opens into the niche 72 and is configured so that the cleaning liquid is sprayed against said spray wall 76 and forms the flat jet.

According to one feature of the invention, at least one dimension of the outlet end 78 of the conduit 74 at the spray outlet 24 is an increasing dimension, increasing toward the spray outlet 24, this dimension being measured perpendicular to a direction of flow C of the cleaning liquid within the conduit 74. It will be appreciated that the cleaning liquid outlet end 78 opens in an increasing manner toward the spray outlet 24. In other words, a dimension measured in the conduit 74 is smaller than a dimension measured at the outlet end 78 of the conduit 74, these two dimensions being measured advantageously in a direction parallel to the transverse direction T.

Moreover, and as is more particularly visible in FIG. 3, the covering wall 54 comprises a notch 80 which, together with the second recess 64, contributes to delimiting the cavity 30 of the ducting circuit 12. The notch 80 extends toward the spray flank 68 of the second part 18 and progressively widens as it nears the spray flank 68. From that it will be appreciated that a dimension measured in the transverse direction of the notch 80, which is to say a direction perpendicular to a direction in which the air flow circulates, tends to increase progressively with increasing proximity to the spray flank 68.

In addition, the air flow outlet 32 is positioned near the spray outlet 24. The opening of the notch 80 is designed so that some of the air flow circulates toward the spray outlet 24 so as to wipe or even dry the spray outlet 24 after cleaning liquid has been sprayed.

From the foregoing it will be appreciated that the cleaning liquid begins by circulating in the pipe 20, notably from the free end 34 of the pipe 20 toward the first wall 26 of the first part 16. The cleaning liquid then extends into the chamber

22 formed by the first recess 62 of the first part 16 and the covering wall 54 of the second part 18. Once the chamber 22 is full of cleaning liquid, this liquid flows through the conduit 74 toward the spray wall 76. Depending on the flow velocity of the cleaning liquid, it will be sprayed with greater or lesser pressure against the spray wall 76 and then form the flat jet able to clean the detection surface of one of the detection devices.

The air flow itself circulates along the duct 28, notably from the free edge 42 of the duct 28 toward the first wall 26 of the first part 16. The air flow is then guided through the chamber 22 by the second recess 64 of the first part 16 and the covering wall 54 of the second part 18 toward the air flow outlet 32. More specifically, the air flow circulates from the duct 28 through the cavity 30, which is to say through the second recess 64 and the notch 80, toward the spray outlet 24. Depending on the flow velocity of the air flow, this flow then circulates toward the detection surface of one of the detection elements in order to dry or even clean said surface.

Moreover and as is more particularly visible in FIG. 2, the cleaning device 4 comprises at least one attachment element for attachment to one of the detection devices, the attachment element being borne by the same part 16, 18 of the cleaning device 4 as the part that bears the pipe 20 and the duct 28, which is to say in this instance the first part 16. According to the example illustrated here, the cleaning device 4 comprises a first attachment element 82 and a second attachment element 84, the first attachment element 82 being for example an element for centering the cleaning device 4 relative to the detection surface that is to be cleaned, and the second attachment element 84 enabling the cleaning device 4 to be held in position. The attachment elements 82, 84 may also be screws or any other known means of attachment that enable the cleaning device 4 to be attached and held in position close to the detection device. The cleaning device 4 is thus held in position notably by virtue of the attachment elements 82, 84, but may also be held in position by the coupling of the pipe 20 and of the duct 28 to, respectively, the distribution system and the circulation system of the vehicle and/or of the driver-assist system.

As illustrated here in FIG. 2, the first part 16 comprises a second wall 86 extending from the first face 36 of the first wall 26 in a plane in which the transverse direction T is inscribed, this plane being substantially perpendicular to the plane in which the first wall 26 of the first part 16 extends. The attachment elements 82, 84 here extend from the second wall 86 in the direction away from the pipe 20 and from the duct 28. In addition, one of the attachment elements 82, 84 is aligned with the spray outlet 24 in the longitudinal direction L, the other being positioned at a transverse end of the first part 16.

Figure 4:
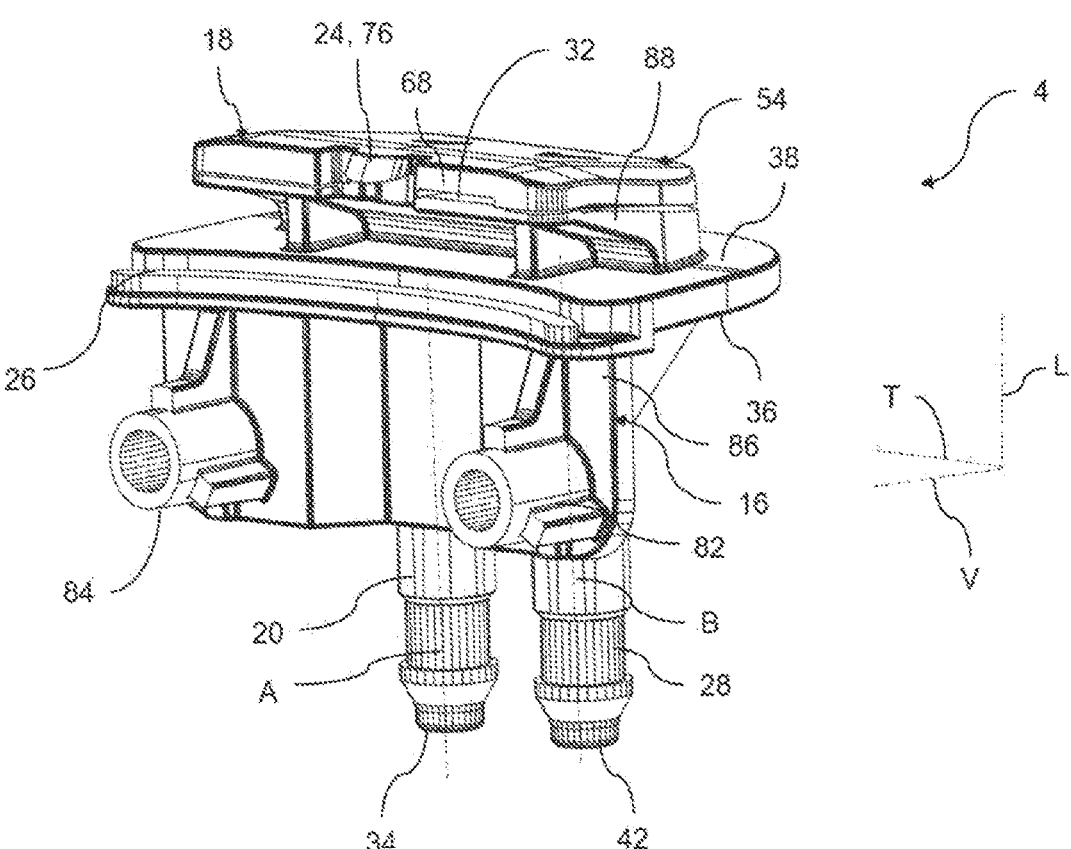
FIG. 4 is a perspective depiction of a second embodiment of a cleaning device according to the invention.
Figure 5:
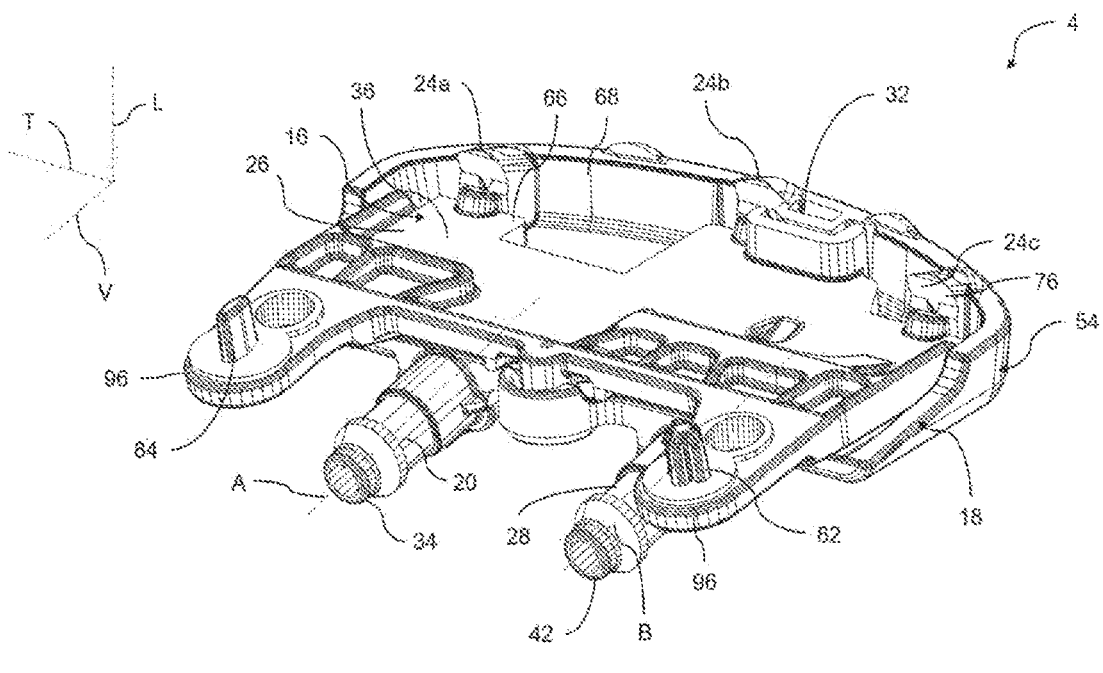
FIG. 5 is a perspective depiction, viewed from beneath, of a third embodiment of a cleaning device according to the invention.

According to a second embodiment of the invention, illustrated notably in FIG. 4, the attachment elements 82, 84 are positioned at the transverse ends of the first part 16.

Moreover, in this second embodiment of the invention, the first part 16 comprises an additional wall 88 extending in a plane parallel to the plane in which the first wall 26 is inscribed, the additional wall 88 being on the opposite side of the first wall 26 to the second wall 86. In this exemplary embodiment of the invention, it is the additional wall 88 that contributes to at least partially delimiting the distribution network 10 and the ducting circuit 12, the additional wall 88 performing the same function as the first wall 26 in the first embodiment.

A third embodiment of the invention will now be described with reference in particular to FIGS. 6 and 7.

Figure 6:
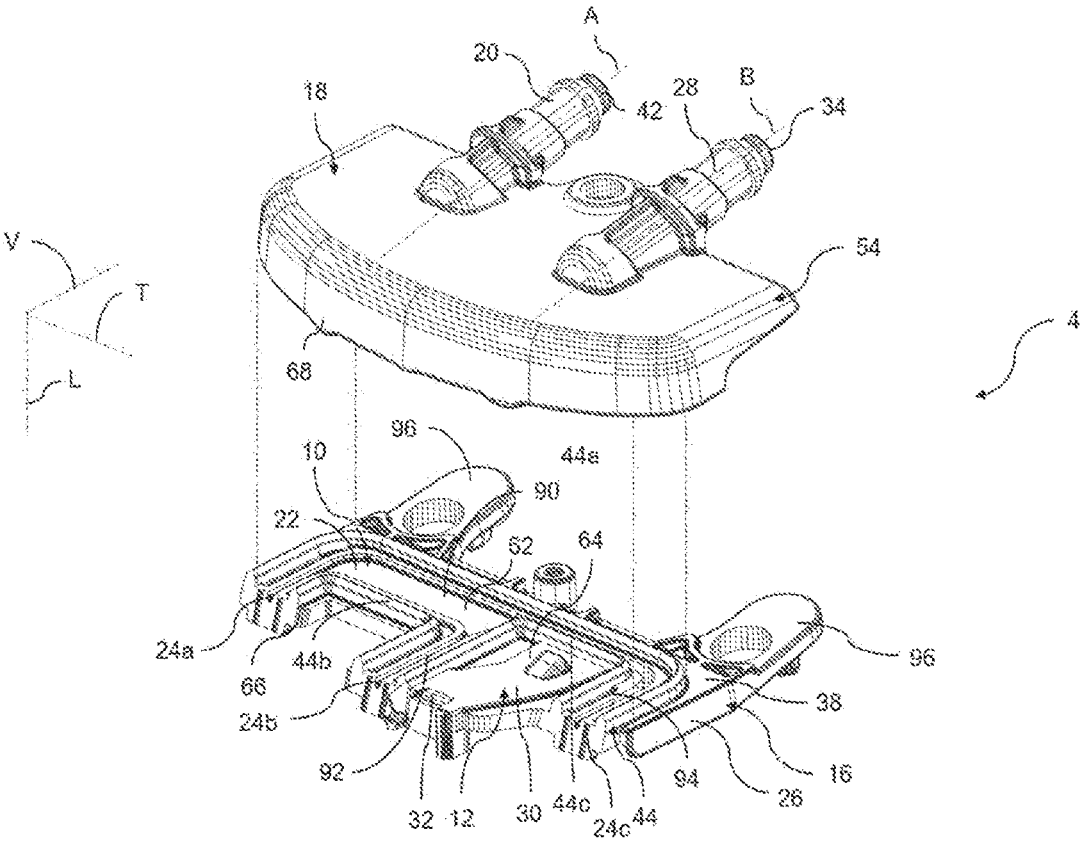
FIG. 6 is an exploded view of the cleaning device depicted in FIG. 5.
Figure 7:
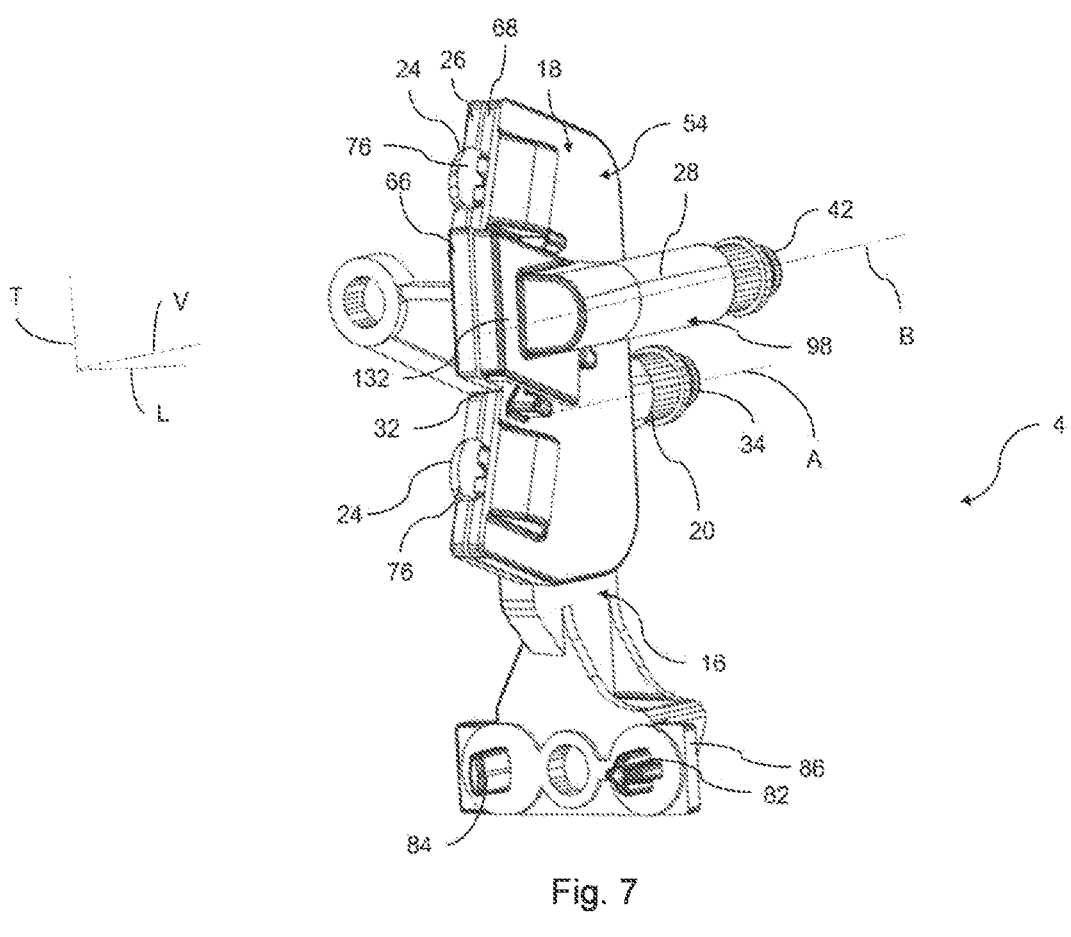
FIG. 7 is a perspective depiction of a fourth embodiment of a cleaning device according to the invention.

As illustrated in FIGS. 6 and 7, the overall direction of extension A of the pipe 20 and the main direction of extension B of the duct 28 are both substantially parallel to the planes in which the first wall 26 of the first part 16 and the covering wall 54 of the second part 18 are inscribed.

According to one feature of this third embodiment of the invention, the distribution network 10 comprises at least a first cleaning liquid spray outlet 24*a*, a second cleaning liquid spray outlet 24*b* and a third cleaning liquid spray outlet 24*c*. These three spray outlets 24*a*, 24*b*, 24*c* are formed in a similar way to that described previously in the first embodiment.

In order to convey the cleaning liquid from the pipe 20 as far as each of the spray outlets 24*a*, 24*b*, 24*c*, the chamber 22 adopts the overall shape of a "W". In this arrangement, the chamber 22 comprises a main part 90 extending in a direction parallel to the transverse direction T and onto which the pipe 20 opens, and three branches extending from the main part 90 toward the spray edge 66, these being a central branch 92 and two end branches 94. More particularly, each of the branches 92, 94 extends between the main part 90 and one of the spray outlets 24*a*, 24*b*, 24*c*.

Moreover, the separation elements 44 and the separation members 46 are arranged in such a way that the chamber 22 adopts the overall shape of a "W". Each of the separation elements 44 and of the separation members 46 adopts the overall shape of a "U" so that a first separation element 44*a* contributes to delimiting the central part 90 and the two end branches 94, so that a second separation element 44*b* contributes to delimiting one of the two end branches 94 and the central branch 92, and so that a third separation element 44*c* contributes to delimiting the other end branch 94 and the central branch 92. The separation members 46 extend in a similar way to the separation elements 44.

In addition, the attachment elements 82, 84 are each positioned at an extension 96 of the first wall 26 of the first part 16, each of the extensions 92 extending in a plane substantially parallel to the plane in which the first wall 26 is inscribed.

A fourth embodiment of the invention will now be described with reference in particular to FIGS. 7 and 8.

The cleaning device 4 comprises a first part 16, a second part 18 and at least a third part, the first part 16 and the third part 98 contributing to at least partially delimiting the cleaning liquid distribution network 10, the second part 18 and the third part 98 contributing to at least partially delimiting the air flow ducting circuit 12. It will therefore be appreciated that the second part 18 contributes, on the one hand, to at least partially delimiting the distribution network 10, notably by collaborating with the first part 16, and, on the other hand, to at least partially delimiting the ducting circuit 12, by collaborating with the third part 98.

Figure 8:
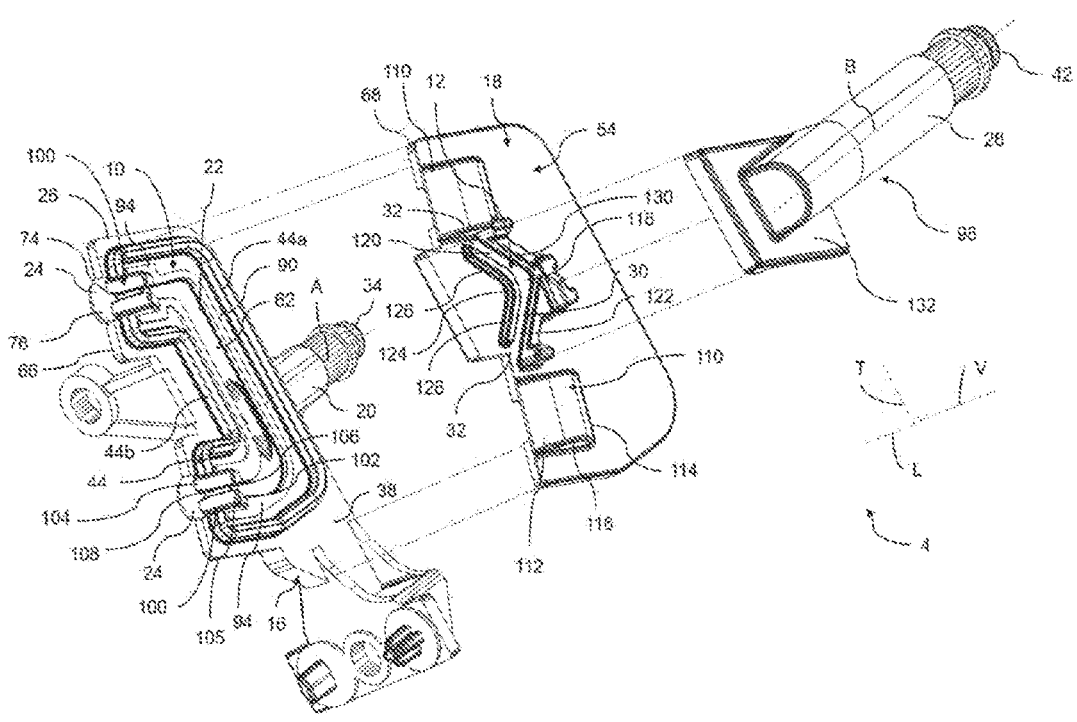
FIG. 8 is an exploded view of the cleaning device depicted in FIG. 7.

As is more particularly visible in FIG. 8, the first part 16 comprises the pipe 20 of the distribution network 10 and contributes, with the second part 18, to delimiting the chamber 22 and at least one spray outlet 24. In addition, the distribution network 10 comprises two cleaning liquid spray outlets 24, each of the spray outlets 24 being installed at one of the transverse ends of the first wall 26.

In order to convey the cleaning liquid to each of the spray outlets 24 from the pipe 20, the chamber 22 adopts the overall shape of a "U". For that purpose, the chamber 22 comprises the central part 90 extending in a direction parallel to the transverse direction T and into which the pipe 20 opens, and two end branches 94 extending from the central part 90 toward the spray edge 66. More particularly, each of the end branches 94 extends between the central part 90 and one of the cleaning liquid spray outlets 24.

Moreover, the separation elements 44 and the separation members 46 are arranged in such a way that the chamber 22 adopts the overall shape of a "U". Each of the separation elements 44 and of the separation members 46 adopts the overall shape of a "U" so that a first separation element 44*a* contributes to delimiting the central part 90 and the two end branches 94, and so that a second separation element 44*b* contributes to delimiting the two end branches 94 and the central part 90, the second separation element 44 being flanked transversely by the first separation element 44. The separation members 46 extend in a similar way to the separation elements 44 on the second part 18.

In addition, the first part 16 comprises at least one block 100 positioned on at least one of the end branches 94 of the chamber 22. According to the example illustrated here in FIG. 8, the first part 16 comprises two blocks 100, each positioned on one of the end branches 94 of the chamber 22. The two blocks 100 are similar, which is to say that the description of a feature of one of the blocks 100 is also valid for the other block 100 unless specified to the contrary; the term "block 100" may refer to one or to the other of the blocks 100, without distinction.

The block 100 has a triangular cross section when viewed in a plane perpendicular to the first wall 26 of the first part 16 and which contains the axis of flow of the cleaning liquid in one of the end branches 94. The block 100 therefore comprises an inner face 102 facing toward the chamber 22, an outer face 104 facing toward the spray outlet 24 and a vertex 105 where the inner face 102 and the outer face 104 meet. The block 100 comprises a conduit 74 comprising a first portion 106 extending along the outer face 104 from the chamber 22 as far as the vertex 105, and a second portion 108 extending from the vertex 105 as far as the spray wall 76 in the direction of flow C. The conduit 74 here is open, which is to say adopts overall the form of an incision made on each of the inner face 102 and outer face 104 of the block 100. However, a closed conduit 74 extending through the block 100 in a similar way to that described hereinabove would not constitute a departure from the scope of the invention.

The first portion 106 and the second portion 108 of the conduit 74 each extend in a direction secant to the first wall 26 of the first part 16. In addition, the second portion 108 of the conduit 74 extends in a direction secant to the plane in which the spray wall 76 extends.

To complement this, the second part 18 comprises two hollows 110 in which the blocks 100 may be housed, the two hollows 110 being similar. In the remainder of the description, the description of a feature of one of the hollows 110 is also valid for the other hollow 110 unless specified to the contrary; the term "hollow 110" may refer to one or to the other of the hollows 110, without distinction.

The hollow 110 has a triangular cross section when viewed in a plane perpendicular to the covering wall 54 of the second part 18 and which contains the axis of flow of the cleaning liquid in one of the end branches 94. The hollow 110 thus has a front face 112 intended to be in contact with the outer face 104 of the block 100, a rear face 114 intended to be in contact with the inner face 102 of the block 100, and two triangular lateral faces 116 extending substantially parallel to one another between the front face 112, the rear face 114 and the covering wall 54.

When the second part 18 is mounted on the first part 16, the rear face 114 of the hollow 110 collaborates with the inner face 102 of the block 100 so as to close the first portion

106 of the conduit 74, the front face 112 of the hollow 110 itself collaborating with the outer face 104 of the block 100 so as to close the second portion 108 of the conduit 74.

Thus, when the cleaning liquid circulates through the distribution network 10 it flows in the pipe 20 then in the central part 90 of the chamber 22 toward each of the end branches 94. The cleaning liquid then circulates in the first portion 106 of the conduit 74 then in the second portion 108 of the conduit 74 before being sprayed against the spray wall 76 to form the flat jet.

As is more particularly visible in FIG. 8, the third part 98 comprises the duct 28 of the ducting circuit 12 and contributes, with the second part 18, to delimiting the cavity 30 and at least one air flow outlet 32. In addition, the ducting circuit 12 comprises two air flow outlets 32, each of the air flow outlets 32 being installed close to one of the cleaning liquid spray outlets 24.

In order to guide the air flow toward one or the other of the air flow outlets 32, the chamber 22 comprises a junction zone 118 into which the duct 28 opens, a first part 120 extending from the junction zone 118 toward one of the air flow outlets 32 and a second part 122 extending from the junction zone 118 toward the other air flow outlet 32. The first and second parts 120, 122 of the chamber 22 each extend substantially in a straight line, which is to say in a main direction of extension.

In a similar way to the way in which the chamber 22 of the cleaning liquid distribution network 10 is delimited, the cavity 30 is delimited by separation elements 44 positioned on the second part 18 and separation members 46 installed on the third part 98. More particularly, the separation elements 44 here adopt the form of ribs and the separation members 46 adopt the form of grooves in which the ribs may be housed. According to the example illustrated here in FIG. 8, the second part 18 comprises a first rib 124 having a first segment 126 and a second segment 128 each extending in a direction secant with a direction in which the other segment 126, 128 extends and contributes to delimiting the cavity 30 at the spray edge 66. The second part 18 comprises a second rib 130 likewise having two segments, each of these segments extending parallel to one or the other of the first and second segments 126, 128 of the first rib 124, the second rib 130 being positioned on the opposite side of the first rib 124 to the spray edge 66.

The third part 98 itself comprises grooves positioned in such a way as to collaborate with the ribs of the second part 18, the grooves being positioned on a rectangular wall 132 of the third part 98, this rectangular wall 132 extending in a plane parallel to the plane in which the covering wall 54 of the second part 18 is inscribed. When the third part 98 is mounted on the second part 18, the cavity 30 is then delimited by the ribs forming separation elements 44, by the covering wall 54 and by the rectangular wall 132 of the third part 98.

The present invention is not limited to the means and configurations described and illustrated here, but also extends to any equivalent means and configurations and to any technically operational combination of such means. In particular, the shape and the characteristics of the chamber 22 and of the cavity 30 could be modified without harming the invention provided that they perform the functions described in the present document, and the same is true of the number of spray outlets 24 and/or the number of air flow outlets 32.

What is claimed is:

1. A cleaning device for cleaning a glazed surface of a detection device for a vehicle, the cleaning device comprising at least two parts fitted against one another and which at least partly delimit a cleaning liquid distribution network and an air flow ducting circuit, the cleaning liquid distribution network being distinct from the air flow ducting circuit, the air flow ducting circuit includes an air flow outlet on an external surface of the cleaning device, with the cleaning liquid distribution network including at least a pipe, a chamber, a cleaning liquid spray outlet being hydraulically connected to the pipe by the chamber, the chamber and the spray outlet being delimited by a first part and a second part of the at least two parts, whereas the pipe is delimited by just the second part, with the first part including a first surface and the second part including a second surface and a portion of the first surface being in contact with a portion of the second surface to form at least the cleaning liquid spray outlet.

2. The cleaning device as claimed in claim 1, wherein at least one dimension of the cleaning liquid spray outlet is an increasing dimension, the at least one dimension being measured perpendicular to a direction of flow of the cleaning liquid.

3. The cleaning device as claimed in claim 2, wherein the at least one dimension increases from an upstream end portion of the cleaning liquid spray outlet as far as a downstream end portion of the cleaning liquid spray outlet in the direction of flow of the cleaning liquid.

4. The cleaning device as claimed in claim 1, wherein the first part and/or the second part contributes to delimiting at least one conduit extending into the chamber and opening at the cleaning liquid spray outlet, the first part or the second part bearing a spray wall extending in a plane secant to a main direction of elongation of the at least one conduit.

5. The cleaning device as claimed in claim 4, wherein at least one dimension of one end of the at least one conduit at the cleaning liquid spray outlet is an increasing dimension, increasing toward the cleaning liquid spray outlet, the at least one dimension being measured perpendicular to a direction of flow of the cleaning liquid within the at least one conduit.

6. The cleaning device as claimed in claim 1, wherein the air flow ducting circuit includes at least a duct, a cavity, the air flow outlet being aeraulically connected to the duct by the cavity, the cavity and the air flow outlet being delimited by the first part and the second part, whereas the duct is delimited by just the second part.

7. The cleaning device as claimed in claim 1, wherein the second part includes at least one separation element separating the cleaning liquid distribution network from the air flow ducting circuit, the first part includes at least one separation member able to collaborate with the separation element so as to separate the cleaning liquid distribution network from the air flow ducting circuit in a fluidtight manner.

8. A detection assembly comprising at least one detection device including at least one detection surface and a cleaning device for cleaning the detection surface, with the cleaning device including at least two parts fitted against one another and which at least partly delimit a cleaning liquid distribution network and an air flow ducting circuit, the cleaning liquid distribution network being distinct from the air flow ducting circuit, the air flow ducting circuit includes an air flow outlet on an external surface of the cleaning device, with the cleaning liquid distribution network including at least a pipe, a chamber, a cleaning liquid spray outlet being hydraulically connected to the pipe by the chamber, the chamber and the spray outlet being delimited by a first part and a second part of the at least two parts, whereas the pipe is delimited by just the second part, with the first part including a first surface and the second part including a second surface and a portion of the first surface being in contact with a portion of the second surface to form at least the cleaning liquid spray outlet.

* * * * *